US010862352B2

(12) United States Patent
Lin (10) Patent No.: US 10,862,352 B2
(45) Date of Patent: Dec. 8, 2020

(54) WIRELESS CHARGING ALIGNMENT METHOD AND SYSTEM

(71) Applicant: Yi Sheng Lin, New Taipei (TW)

(72) Inventor: Yi Sheng Lin, New Taipei (TW)

( * ) Notice: Subject to any disclaimer, the term of this patent is extended or adjusted under 35 U.S.C. 154(b) by 123 days.

(21) Appl. No.: 16/255,403

(22) Filed: Jan. 23, 2019

(65) Prior Publication Data

US 2020/0212728 A1 Jul. 2, 2020

(30) Foreign Application Priority Data

Dec. 28, 2018 (TW) ............... 107147710 A (51) Int. Cl.
*H02J 50/90* (2016.01)
*H02J 7/00* (2006.01)
*H02J 7/02* (2016.01)

(52) U.S. Cl.
CPC ............ *H02J 50/90* (2016.02); *H02J 7/0044* (2013.01); *H02J 7/025* (2013.01)

(58) Field of Classification Search
CPC ........ H02J 7/0044; H02J 7/0045; H02J 50/90; H02J 7/025
USPC .......................... 320/107, 108, 115; 455/573
See application file for complete search history.

(56) References Cited

U.S. PATENT DOCUMENTS

| 7,683,572 B2 * | 3/2010 | Toya .................. H02J 7/0044 320/108 |
| 2016/0064987 A1 * | 3/2016 | Sheu .................. H02J 7/025 320/108 |
| 2018/0226827 A1 * | 8/2018 | Chen .................. H02J 7/027 |
| 2018/0287413 A1 * | 10/2018 | Jung .................. H02J 50/90 |

* cited by examiner

*Primary Examiner* — Edward Tso
*Assistant Examiner* — Aaron Piggush
(74) *Attorney, Agent, or Firm* — Rabin & Berdo, P.C.

(57) ABSTRACT

The disclosure provides a wireless charging alignment method and system, the system comprising an electronic device and a wireless charging device, the electronic device having a display screen capable of displaying at least an marking symbol, the wireless charging device having a placement surface, the wireless charging device being disposed with at least a wireless charging module inside the placement surface, and the wireless charging device further comprising at least a corresponding symbol; the alignment method of the present invention is, in the process of placing the electronic device on the placement surface, to align the marking symbol to the corresponding symbol is aligned with the corresponding symbol, thereby quickly and accurately completing the alignment of the wireless charging, and a better subsequent charging performance can be performed.

10 Claims, 10 Drawing Sheets

WIRELESS CHARGING ALIGNMENT METHOD AND SYSTEM

This application claims the priority of Taiwan Patent Application No. 107147710, entitled "WIRELESS CHARGING ALIGNMENT METHOD AND SYSTEM", filed on Dec. 28, 2018, the disclosure of which is incorporated herein by reference in its entirety.

TECHNICAL FIELD

The technical field generally relates to a technical field of wireless charging, and in particular to a design for fast charging position alignment between an electronic device and a wireless charging device.

BACKGROUND

Wireless charging technology, to provide power by non-physical contact, is more and more popular as the technology matures. Various types of electronic mobile devices, such as mobile phones and tablet computers, are adopting the wireless charging technology increasingly.

However, to improve the wireless charging efficiency, the charging position of the electronic device and the wireless charging device or wireless charger must be accurately aligned when used. To solve this problem, the current methods are mainly divided into two categories:

1. Using a built-in software and detection circuit inside the electronic device, when the electronic device is placed on the wireless charger, if the charging position is not correctly aligned, the electronic device will directly display a message or ringing as a reminder, and the user then moves the electronic device to adjust to the correct position. The disadvantage is that the electronic device has to be moved and adjusted every time, and cannot be quickly moved to the correct position, which is time consuming and inconvenient; in addition, the electronic device with this function has a higher unit price, which increases the financial burden on the user.
2. Improving the structure of the wireless charger, for example, multiple sets of charging transmitting coils are added at multiple locations inside to solve the problem of difficulty in alignment by enlarging the charging range; alternatively, a moving mechanism is provided inside to adjust the position of the charging transmitting coil. The disadvantage is that the internal structure of the wireless charger is too complicated and high in cost.

Therefore, it is imperative to address the aforementioned issues with a more convenient design.

SUMMARY

The primary object of the present invention is to provide a wireless charging alignment method and system, mainly by an electronic device to be charge displaying an marking symbol to match a corresponding symbol on a wireless charging device to achieve alignment when the electronic device is placed for charging, greatly reducing time and process of correction and alignment, providing users with great convenience.

To achieve the object, the wireless charging alignment system of the present invention comprises an electronic device and a wireless charging device, the electronic device having a display screen capable of displaying at least an marking symbol, the wireless charging device having a placement surface, the wireless charging device being disposed with at least a wireless charging module inside, located at a position corresponding to the placement surface, and the wireless charging device further comprising at least a corresponding symbol; when the electronic device being placed on the placement surface, the marking symbol being aligned with the corresponding symbol to achieve position alignment for wireless charging.

Furthermore, the wireless charging alignment method of the present invention comprises the steps of: a display screen of an electronic device displaying at least a marking symbol; placing the electronic device on a placement surface of a wireless charging device, alignment the marking symbol with at least a corresponding symbol on the wireless charging device.

In a preferred embodiment, the marking symbol are displayed at at least two marking positions at different positions on the display screen, and the corresponding symbol is formed on the placement surface to allow the marking positions aligned with the corresponding symbol. This approach is suitable for a platform wireless charging device.

In a preferred embodiment, the marking symbol is a marking line, and the corresponding symbol is an alignment line; the length of the alignment line is greater than the size of the electronic device; when the electronic device is placed on the placement surface, both ends of the marking line can be easily aligned with the alignment line.

In a preferred embodiment, the wireless charging device further comprises two clamping arms, and the two clamping arms are mounted on two sides of the wireless charging device, wherein at least one of the clamping arms can move toward or away from the other clamping arm, wherein the corresponding symbol is formed on at least one of the clamping arms; thereby, when the electronic device is placed on the placement surface and is clamped by the two clamping arms, by aligning the corresponding symbol with the corresponding symbol, the user can use the electronic device and perform charging in a hands-free manner.

In a preferred embodiment, the wireless charging device further comprises a stopping member protruding from the placement surface, the stopping member having the at least a corresponding symbol, when the electronic device is placed on the placement surface with a side abutting the stopping member, so that the marking symbol can be aligned with the corresponding symbol to achieve alignment fast.

The wireless charging alignment method and system of the present invention are characterized in that the electronic device displays the marking symbol in a database of built-in software to a corresponding symbol on a wireless charging device to achieve alignment when the electronic device is placed for charging, to ensure alignment ready for subsequent charging to improve charging efficiency to achieve optimal charging result.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
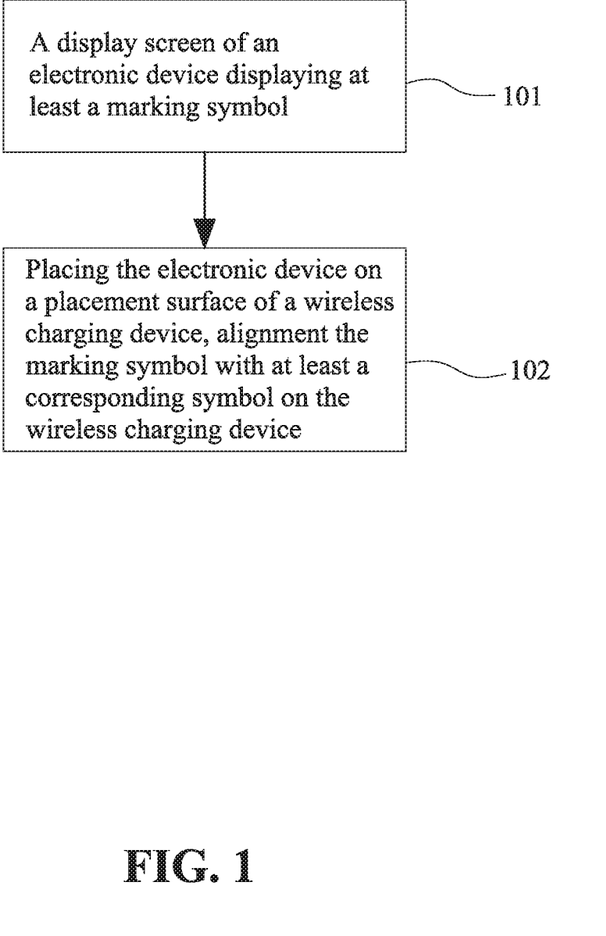
FIG. 1 shows a schematic view of the flowchart of the wireless charging alignment method in accordance with an exemplary embodiment of the present invention.

FIG. 1 shows a flowchart of wireless charging alignment method according to the present invention. The method comprises the following steps:

Step 101: Display at least an marking symbol on a display screen of an electronic device;

Step 102: Place the electronic device on a placement surface of a wireless charging device, and the marking symbol is aligned with at least a corresponding symbol on the wireless charging device.

As such, the present invention can quickly complete the alignment of the electronic device placed on the wireless charging device, and maintain better charging performance during the subsequent wireless charging process.

Figure 2:
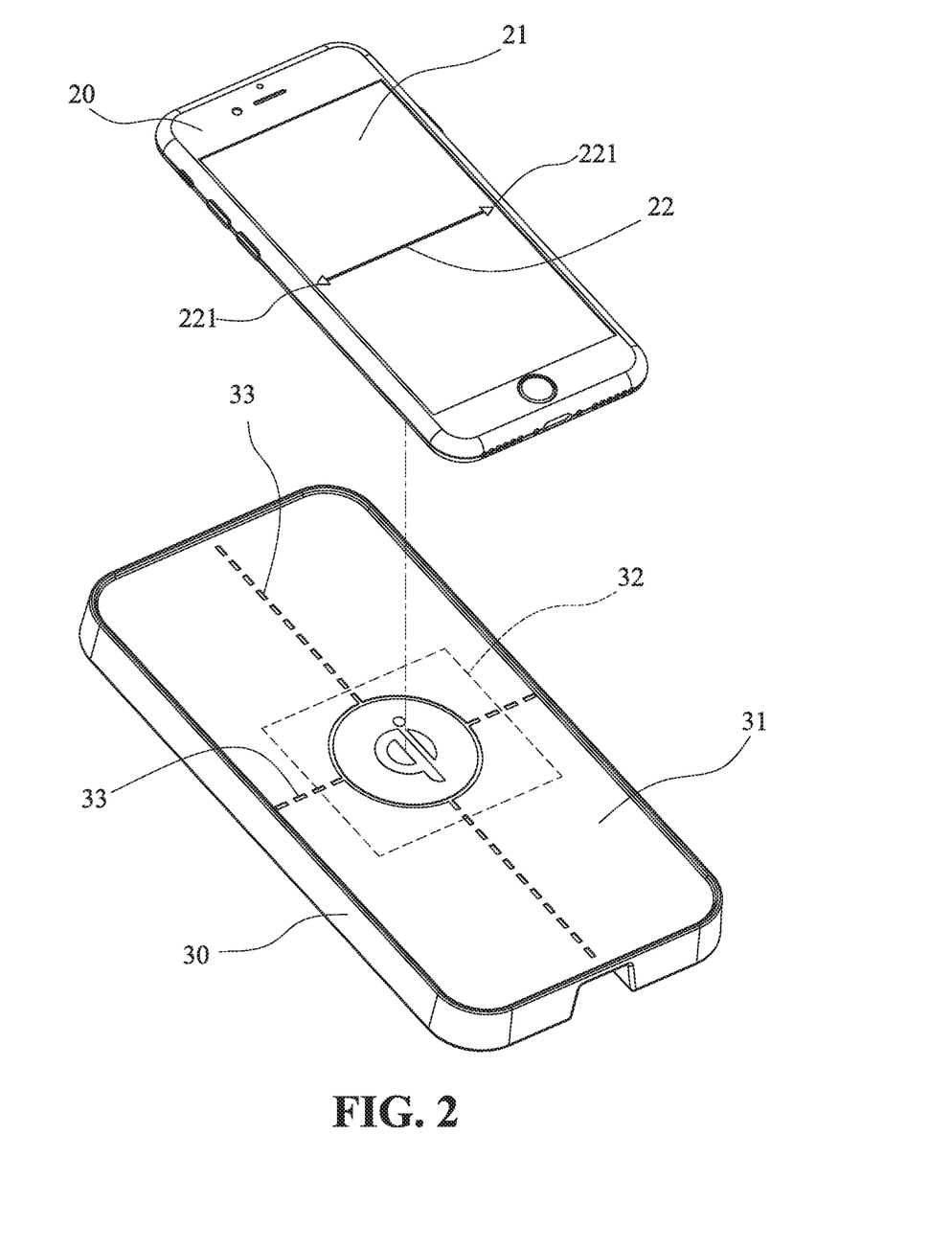
FIG. 2 shows a dissected schematic view of the electronic device of the wireless charging alignment system in accordance with a first exemplary embodiment of the present invention.

The present invention will be described in detail in the following, as shown in FIG. 2, which is a dissected view of the wireless charging alignment system of the present invention. The wireless charging alignment system comprises an electronic device 20 and a wireless charging device 30. The electronic device 20 is a portable electronic product capable of wireless charging, such as, a mobile phone, a tablet computer, a video player, and so on. The electronic device 20 is provided with a display screen 21, which can display at least a marking symbol 22. The marking symbol is generated by an application software installed on the electronic device 20 according to a built-in database. For example, in the present embodiment, the electronic device 20 is a mobile phone, and the application software establishes a database for optimal charging position for each mobile type according to data obtained by independent experiments conducted by the inventor or provided by different manufacturers for different models. When the application software is installed on different electronic devices, the application software can display the optimal charging position with the marking symbol 22 on the display screen 21 according to the database. The application software can be continuously updated by a cloud database to meet the needs of new products.

Figure 3A:
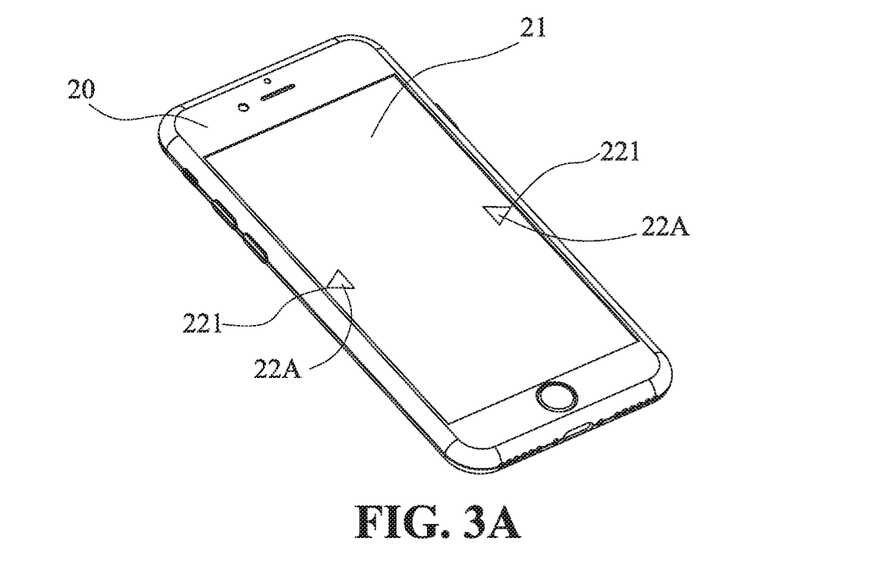
FIG. 3A shows a schematic view of the marking symbol of the electronic device of the wireless charging alignment system in accordance with an exemplary embodiment of the present invention.
Figure 3B:
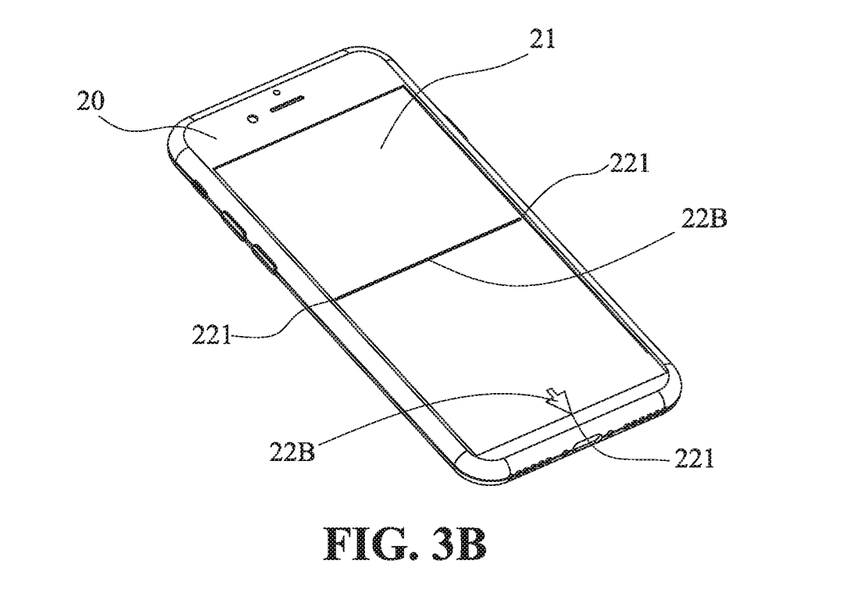
FIG. 3B shows a schematic view of another marking symbol of the electronic device of the wireless charging alignment system in accordance with an exemplary embodiment of the present invention.

In a preferred embodiment, the marking symbol 22 displays at least two marking positions 221 at different positions of the display screen 21. In FIG. 2, the marking symbol 22 is a marking line, and the two marking positions 221 are displayed on both sides of the display screen 21 in a manner to facilitate subsequent visual alignment. The form of the marking symbol 22 is not limited to, such as an arrow, a triangle, or other symbols. As shown in FIG. 3A, the marking symbol 22A includes two triangles; or as shown in FIG. 3B, the marking symbol 22B includes a single straight line and an arrow. When the number of the marked positions 221 displayed at the edge of the display screen 21 reaches three, the alignment of subsequent charging will be more precise and easier. In addition to the display of a static image, the marking symbol can also be presented by the dynamic moving trajectory.

In the embodiment of FIG. 2 of the present invention, the wireless charging device 30 is a platform type wireless charging product, and the wireless charging device 30 has a placement surface 31 for placing the electronic device. 20. The wireless charging device 30 is provided with at least a wireless charging module 32 (shown as dash line in the figure) inside, and the wireless charging module 32 uses the known wireless charging technology, including a wireless charging coil and related control circuits. Since this is similar to the known technology, it will not be described in detail. In the embodiment of the present invention, at least a corresponding symbol 33 is formed on the wireless charging device 30. In the embodiment in FIG. 2, the corresponding symbol 33 is formed on the placement surface 31, and the corresponding symbol 33 can be a cross line, a single line, or other symbol that can be aligned with. In this embodiment, the placement surface 31 has a length and a width larger than that of the electronic device 20, and the corresponding symbol 33 is a cross line and the length is also larger than the size of the electronic device 20.

Figure 4:
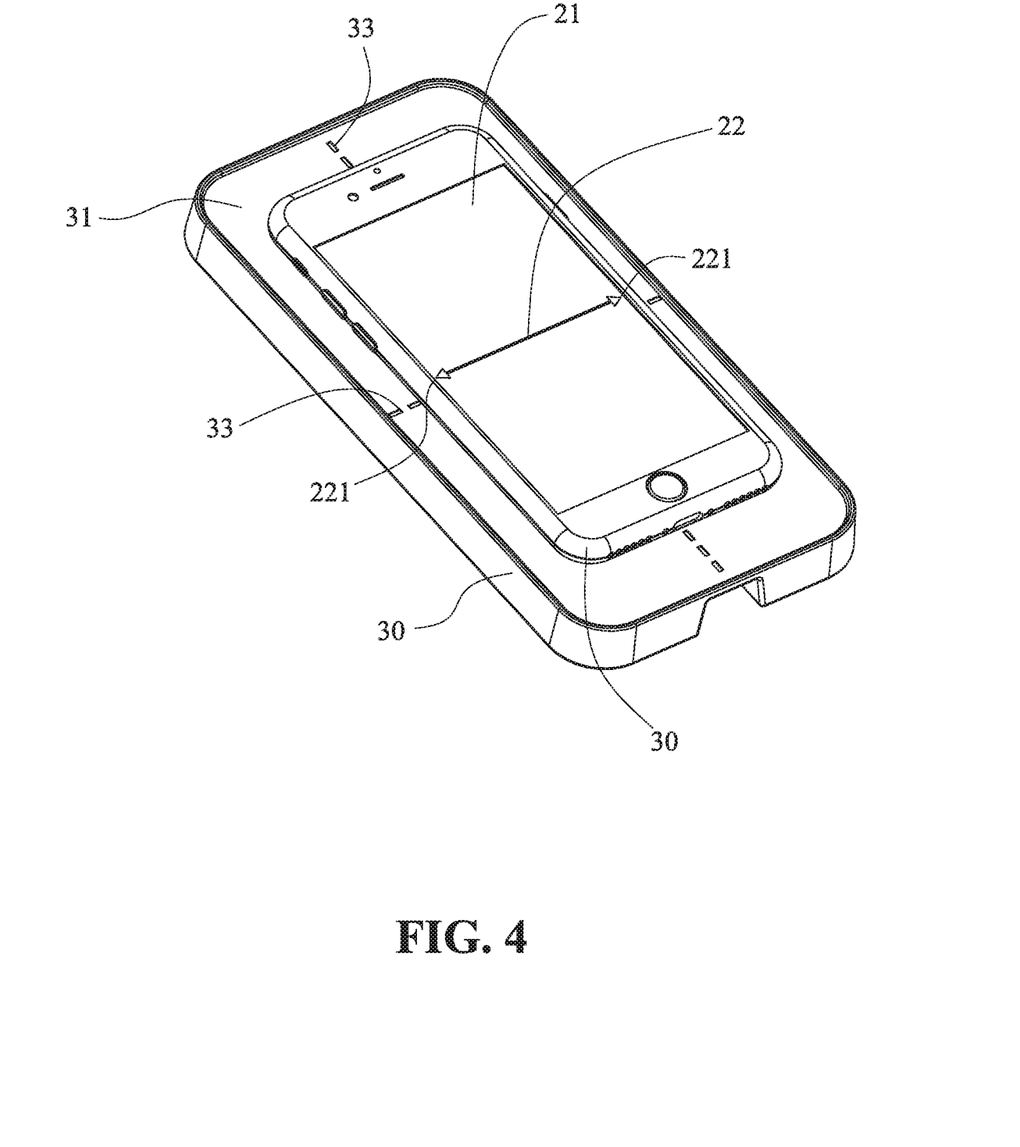
FIG. 4 shows a schematic view of the electronic device in use in the wireless charging alignment system in accordance with the first exemplary embodiment of the present invention.

As shown in FIG. 4, in the process of placing the electronic device 20 on the wireless charging device 30, the user can visually check whether the marking symbol 22 is aligned with the corresponding symbol 33, and adjust the position of the electronic device 20 to ensure that it is located after being placed at the best charging position for the optimal charging performance. In addition, in general, the charging induction coils of the electronic device 20 are all located at the center position, so that the marking symbol 22 as a line in the figure can be easily aligned with the corresponding symbol 33 of the cross line. Obviously, if the electronic device 20 generates two marking symbols 22B as shown in FIG. 3B, three marking positions 221 are available for alignment reference, which is faster and easier to align. In addition, if the charging induction coil is not at the center position, one of the marking symbols 22B in FIG. 3B will produce a corresponding offset. Furthermore, the design of the wireless charging device 30 of the present invention can be applied to a plurality of different types of electronic devices. Therefore, when the user selects different electronic devices 20 for charging, the application software installed on the electronic device 20 is also based on the product model, and the display screen 21 displays the marking symbol 22 of the correct charging position. Therefore, the same wireless charging devices 30 can be used by the different electronic devices 20, which saves the user's cost and brings considerable convenience.

Figure 5:
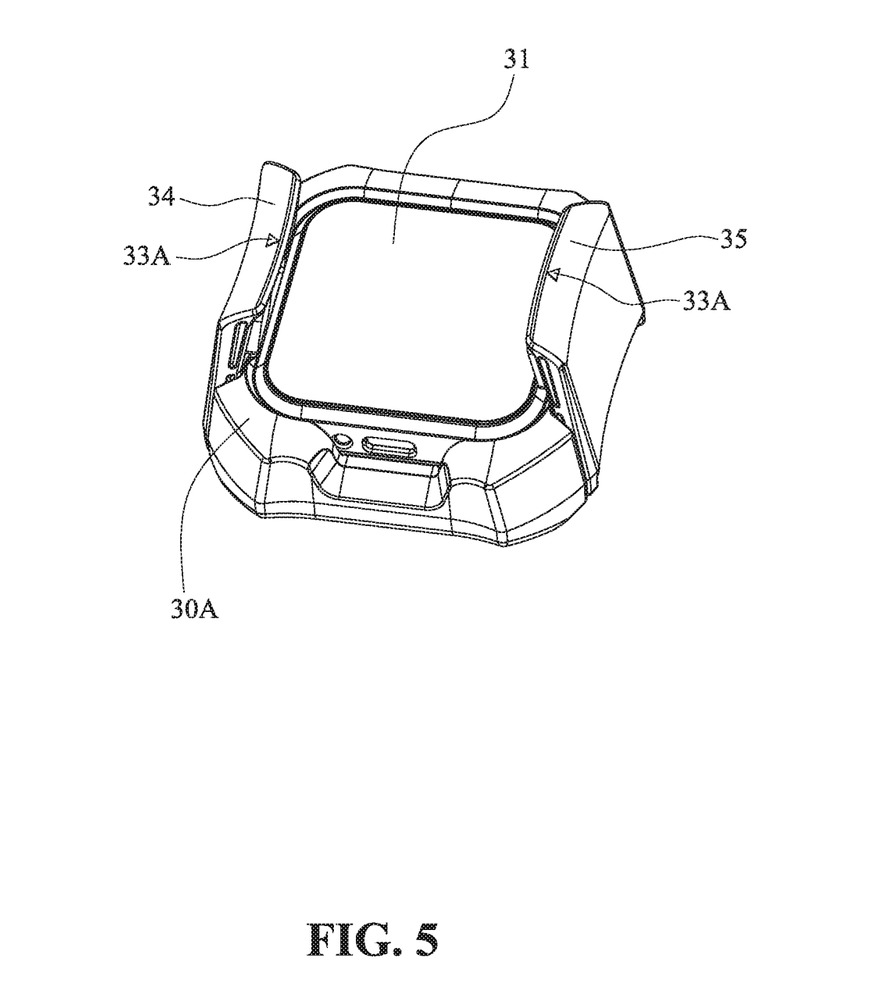
FIG. 5 shows a schematic view of the electronic device in the wireless charging alignment system in accordance with a second exemplary embodiment of the present invention.

FIG. 5 is a schematic view of another wireless charging device 30A of the present invention. In the present embodiment, the wireless charging device 30A is a clamping device. The wireless charging device 30A still has the placement surface 31 and a wireless charging module hidden inside the device, but further comprises two clamping arms 34, 35, and the two clamping arms 34, 35 are mounted on two opposite sides of the wireless charging device 30, wherein at least one of the clamping arms can be moved toward or away from the other clamping arm. In the present embodiment, the two clamping arms 34, 35 can be moved synchronously to open or close. The clamping arms 34, 35 are linked or operated in a similar manner to the conventional clamping mechanisms, and therefore will not be described in detail. In the present invention. The corresponding symbol 33A is formed on at least one of the clamping arms 34 or 35. In the present embodiment, the corresponding symbols 33A are formed on both of the clamping arms 34 and 35. The corresponding symbol 33A is a triangular groove recessed on the top surface of the clamping arms 34, 35. Therefore, the corresponding symbol of the present invention is not limited to the planar printing pattern, and can also be a concave or convex symbol.

Figure 6:
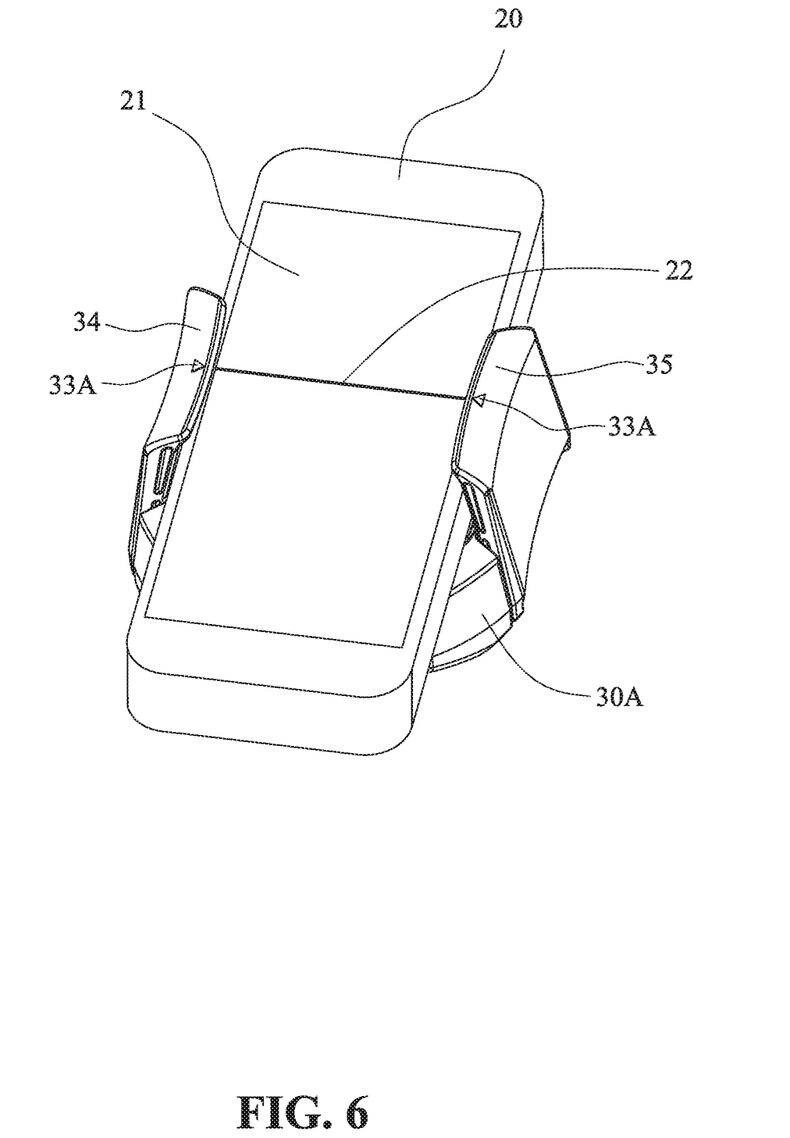
FIG. 6 shows a schematic view of the electronic device in use in the wireless charging alignment system in accordance with the second exemplary embodiment of the present invention.

FIG. 6 is a schematic view of the embodiment of FIG. 5 used in conjunction with an electronic device. Generally, the clamping type wireless electronic device 30A works with a set of suction-type support frames and is fixed in the vehicle for use. Since the size of the wireless charging device 30A is generally smaller than that of the electronic device 20, the present embodiment utilizes the corresponding symbols 33A on the clamping arm 34 and the clamping arm 35, which will not be shielded during use, thereby facilitating the marking symbol 22 of the electronic product 20 aligned with the corresponding symbol 33A for the purpose of rapid and precise alignment of the present invention.

Figure 7:
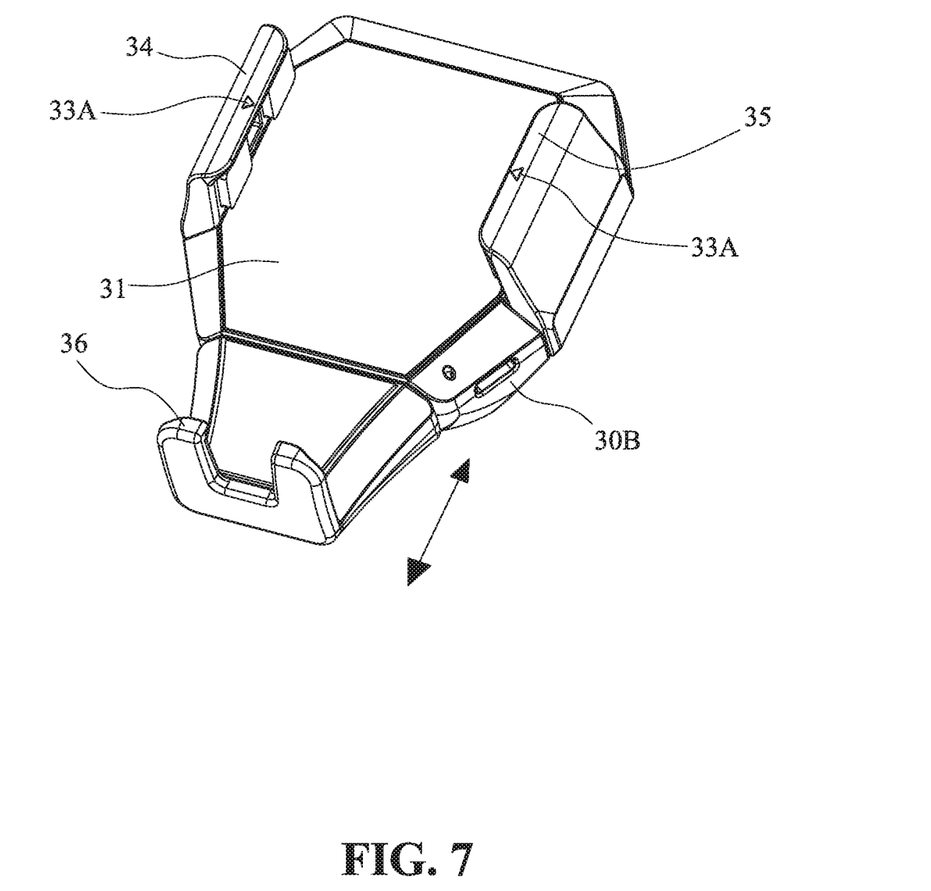
FIG. 7 shows a schematic view of the electronic device in the wireless charging alignment system in accordance with a third exemplary embodiment of the present invention.

FIG. 7 is a schematic view of yet another wireless charging device 30B of the present invention. This embodiment is substantially similar to the embodiment of FIG. 5 and is another type of clamping device. The wireless charging device 30B still comprises the placement surface 31, the wireless charging module hidden inside the device, and the clamping arm 34 and the clamping arm 35, but also further comprises at least a movable stopping member 36, the stopping member 36 is convex from the placing surface 31. When in use, three sides of the electronic device 20 are in contact with the stopping member 36, the clamping arm 34, and the clamping arm 35, thereby fixing the position thereof. In the present embodiment, the corresponding symbols 33A are still formed on the two clamping arms 34, 35. The longitudinal position of the stopping member 36 is designed to be adjustable, and after being adjusted for the first time, it is not necessary to adjust it later, which is more convenient.

Figure 8:
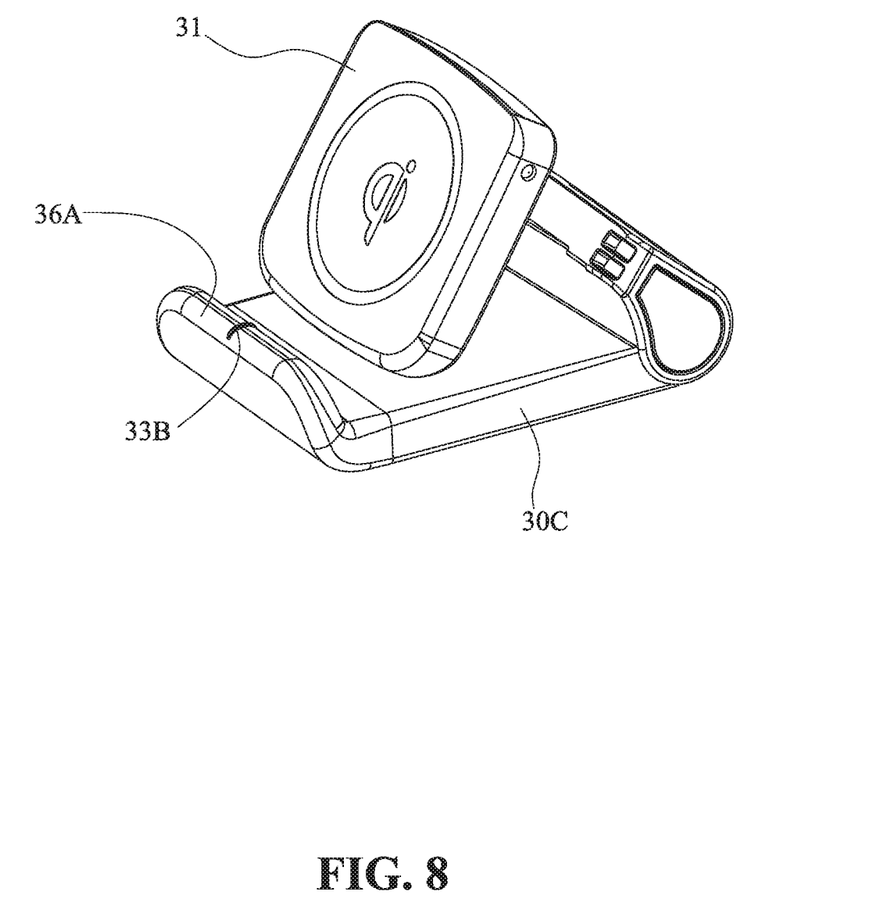
FIG. 8 shows a schematic view of the electronic device in the wireless charging alignment system in accordance with a fourth exemplary embodiment of the present invention.

FIG. 8 is a schematic view of yet another wireless charging device 30C of the present invention. In the present embodiment, the wireless charging device 30C is a reclining wireless charging product. The wireless charging device 30C still has the placement surface 31 for the electronic device 20 to be placed on. The wireless charging module is located under the placement surface 31, except that the placement surface 31 is inclined. The wireless charging device 30C comprises a stopping member 36A that protrudes from the placement surface 31 for preventing the electronic device 20 from slipping off when placed against the placement surface 31. In the present embodiment, the alignment symbol 33B is formed at the stopping member 36A. The corresponding symbol 33B is a concave linear groove.

Figure 9:
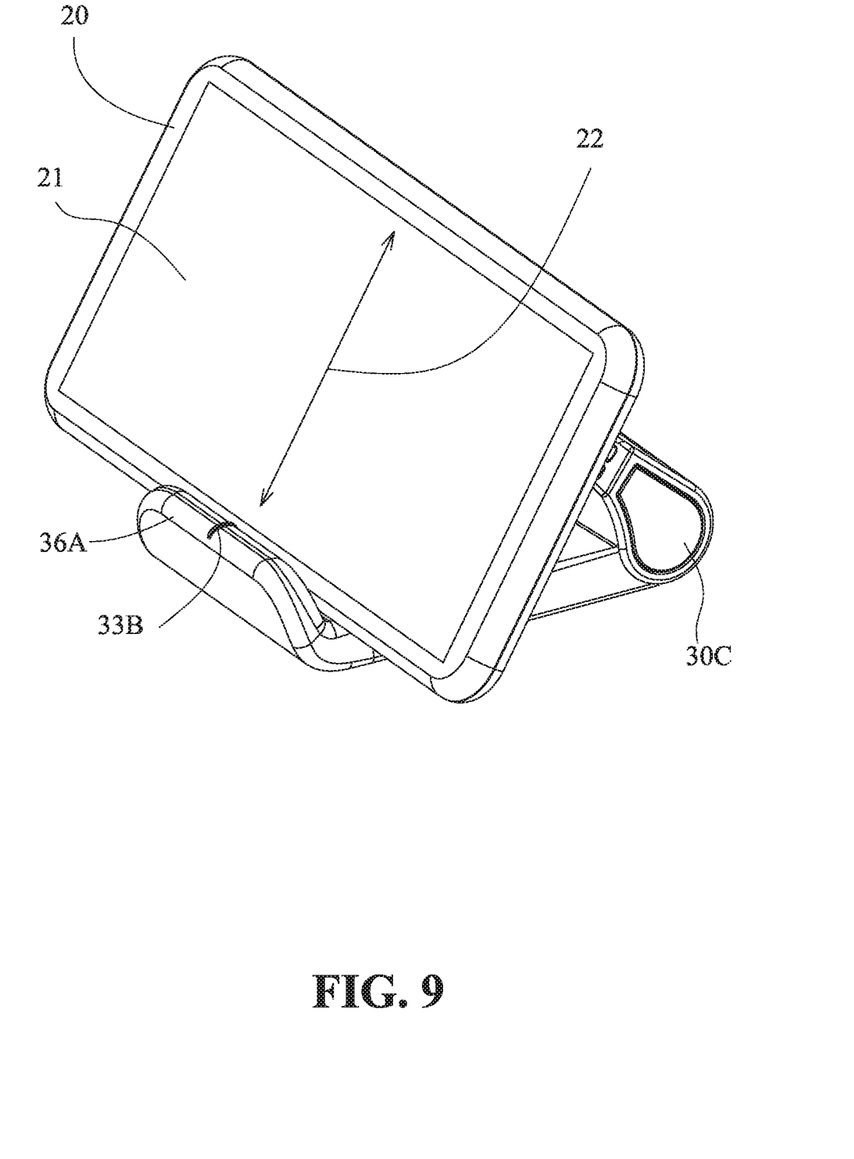
FIG. 9 shows a schematic view of the electronic device in use in the wireless charging alignment system in accordance with the fourth exemplary embodiment of the present invention.

FIG. 9 is a schematic view of the actual use of the embodiment of FIG. 8. The preferred use of the embodiment is that the electronic device 20 is placed in a lateral position, with the back of the electronic device 20 placed on the placement surface 31, and the wide edge is in contact with the stopping member 36A. The stopping member 36A and the edge of the electronic device 20 form an alignment reference line. The electronic device 20 displays the marking symbol 22 and causes the marking symbol 22 to be aligned with the corresponding symbol 33B. As such, the alignment operation of the electronic device 20 and the wireless charging device 30 can be completed. In other words, the design of the present invention can be widely applied to a variety of different wireless charging devices.

Figure 10A:
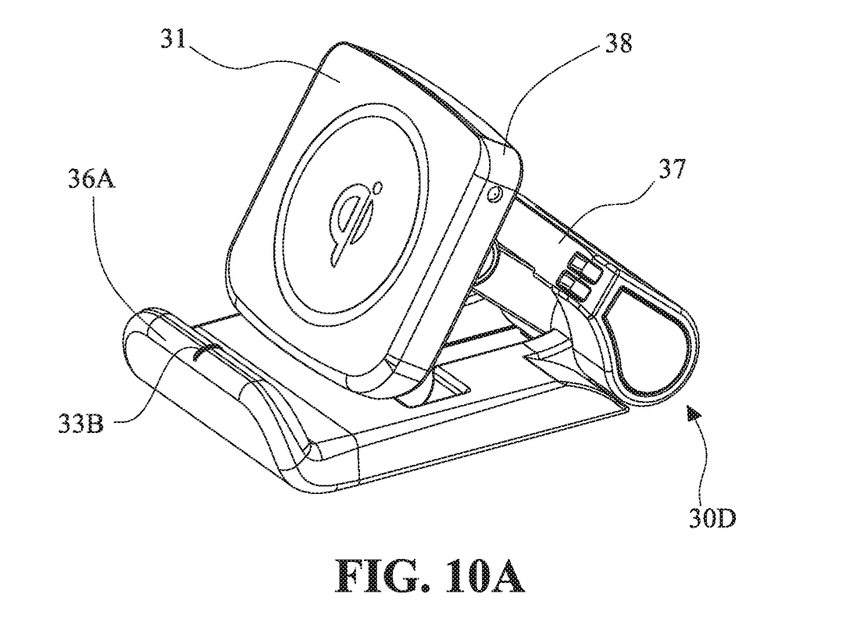
FIG. 10A shows a schematic view of the electronic device in the wireless charging alignment system in accordance with a fifth exemplary embodiment of the present invention.
Figure 10B:
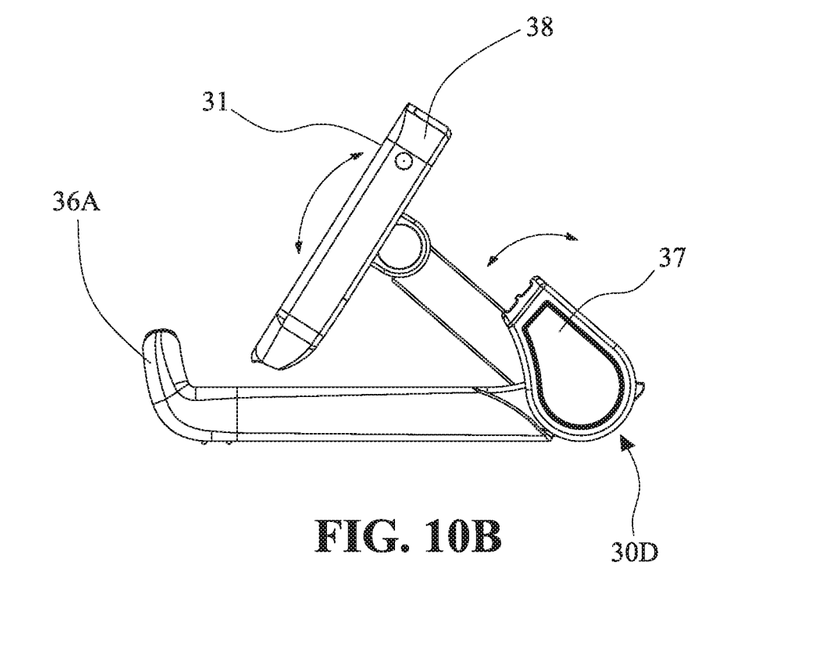
FIG. 10B shows a schematic side view of the electronic device in the wireless charging alignment system in accordance with the fifth exemplary embodiment of the present invention.

FIG. 10A and FIG. 10B are a schematic view and a side view of another wireless charging device 30D of the present invention. The present embodiment is substantially similar to the embodiment of FIG. 8 and is a reclining wireless charging device. However, the present embodiment provides a design in which the position of the placement surface 31 is adjustable. The wireless charging device 30D comprises an adjustable support set 37 and a carrier 38. The adjustable support set 37 is a two-tier adjustable structure, and the stopping member 36A protrudes from the bottom edge of the adjustable support set 37. The top of the adjustable support set 37 is pivotally connected to the carrier 38. The placement surface 31 is on the surface of the carrier 38, and the wireless charging module is located inside the carrier 38. The design is such that when the electronic device 20 has a wider width, the edge of the electronic device 20 abuts and is aligned with the stopping member 36A, the adjustable support set 37 can be used to adjust the placement surface 31 to the center of the back of the electronic device 20. The adjustment allows different types of electronic devices to use such reclining wireless charging devices to achieve better charging performance.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A wireless charging alignment system, comprising:
an electronic device and a wireless charging device, the electronic device having a display screen configured to display at least a marking symbol generated by application software, and the wireless charging device having a placement surface,
the wireless charging device having at least a wireless charging module inside, located at a position corresponding to the placement surface, and the wireless charging device further comprising at least a corresponding symbol;
wherein when the electronic device is placed on the placement surface with the marking symbol aligned with the corresponding symbol, the electronic device is in an alignment position for wireless charging.

2. The wireless charging alignment system as claimed in claim 1, wherein the marking symbol is displayed at at least two marking positions at different positions on the display screen, and the corresponding symbol is formed on the placement surface for aligning the marking positions with the corresponding symbol.

3. The wireless charging alignment system as claimed in claim 1, wherein:
the marking symbol is a marking line, and the corresponding symbol is an alignment line;
a length of the alignment line is greater than a size of the electronic device; and
ends of the marking line are configured to be aligned with the alignment line when the electronic device is placed on the placement surface.

4. The wireless charging alignment system as claimed in claim 1, wherein the marking symbol has a shape of at least one of a line, an arrow, a triangle or other symbol.

5. The wireless charging alignment system as claimed in claim 1, wherein the corresponding symbol is at least one of a cross line, a straight line, an arrow, a triangle, or other symbol able.

6. The wireless charging alignment system as claimed in claim 1, wherein
the wireless charging device further comprises two clamping arms, and the two clamping arms are mounted on two sides of the wireless charging device,
wherein at least one of the clamping arms can move toward or away from another clamping arm of the two clamping arms, and
wherein the corresponding symbol is formed on at least one of the two clamping arms.

7. The wireless charging alignment system as claimed in claim 6, wherein the wireless charging device further comprises a movable stopping member protruding from the placement surface, and when in use, the stopping member and the two clamping arms are in contact with three edges of the electronic device to fix the alignment position of the electronic device.

8. The wireless charging alignment system as claimed in claim 1, wherein
the wireless charging device further comprises a stopping member protruding from the placement surface, the stopping member having the at least the corresponding symbol, and
when the electronic device is placed on the placement surface with a side abutting the stopping member in the alignment position, the marking symbol is aligned with the corresponding symbol.

9. The wireless charging alignment system as claimed in claim 8, wherein the placement surface of the wireless charging device is in an inclining pose.

10. A wireless charging alignment method, comprising the steps of:
displaying, on a display screen of an electronic device, at least a marking symbol;
placing the electronic device on a placement surface of a wireless charging device, and
aligning the marking symbol with at least a corresponding symbol on the wireless charging device.

* * * * *